United States Patent [19]

Metzger

[11] 4,294,090

[45] Oct. 13, 1981

[54] CYCLE LOCK ARRANGEMENT

[76] Inventor: Romain Metzger, 1310 Roscoe, Chicago, Ill. 60657

[21] Appl. No.: 67,350

[22] Filed: Aug. 17, 1979

[51] Int. Cl.³ .................... B62H 5/08; B62H 5/18; E05B 67/06; E05B 71/00
[52] U.S. Cl. .................................. 70/226; 70/39; 70/53; 70/236; 188/31; 280/289 L
[58] Field of Search ............... 70/226, 236, 39, 18, 70/227, 228, 233, 237, 32–34, 53; 280/289 L; 188/31, 69; 292/340

[56] References Cited

U.S. PATENT DOCUMENTS

| | | | |
|---|---|---|---|
| 218,026 | 7/1879 | Hofmann | 70/32 |
| 563,991 | 7/1896 | Thomas et al. | 70/226 |
| 925,810 | 6/1909 | Hopping | 70/226 |
| 1,326,586 | 12/1919 | Fellroth | 292/340 X |
| 1,386,414 | 8/1921 | Lawrence | 70/226 X |
| 1,467,353 | 9/1923 | Childress | 70/226 |
| 1,690,408 | 11/1928 | Hasenflue | 292/340 |
| 1,809,003 | 6/1931 | Van Vorst | 70/227 UX |
| 3,763,674 | 10/1973 | Zahner | 70/226 |
| 3,769,821 | 11/1973 | Randel | 70/33 |
| 3,885,825 | 12/1974 | Pickard | 70/226 X |
| 4,019,354 | 4/1977 | O'Dell | 70/236 |
| 4,030,321 | 6/1977 | Kenyon | 70/34 |
| 4,031,726 | 6/1977 | DeJager | 70/226 |

FOREIGN PATENT DOCUMENTS

| | | | |
|---|---|---|---|
| 517219 | 5/1921 | France | 70/227 |
| 2228654 | 12/1974 | France | 70/228 |
| 203004 | 2/1939 | Switzerland | 70/227 |
| 3578 | 12/1894 | United Kingdom | 70/236 |
| 384524 | 12/1932 | United Kingdom | 70/39 |
| 394812 | 7/1933 | United Kingdom | 70/18 |

Primary Examiner—Ramon S. Britts
Assistant Examiner—Carl F. Pietruszka

[57] ABSTRACT

A lock arrangement for application to a brake disc of a motorcycle wheel.

9 Claims, 8 Drawing Figures

CYCLE LOCK ARRANGEMENT

SUMMARY OF THE INVENTION

This invention relates to cycle locking arrangements, and more particularly to a locking device which may be applied to the brake disc of a motorcycle wheel and which, in combination with the fork of the cycle, will prevent complete rotation of the wheel.

With the number of thefts of cycles, and particularly motorcycles, increasing each year, it is necessary to have a locking device that is relatively inexpensive and easy to apply to a motorcycle to prevent it from being driven or pushed away by a thief.

It is, therefore, an object of this invention to provide a locking device which can be easily and quickly applied to a motorcycle, but which cannot readily be cut away or removed.

Another object of the invention is the provision of a cycle lock arrangement which can be applied to the brake disc of a cycle, and while so attached will engage the fork of the cycle and prevent the wheel from turning.

A more specific object of the invention is the provision of a locking device of the type described which includes a lock having a housing with a cavity for receiving a portion of the locking mechanism and which is disposed adjacent a wheel disc so there is no access for cutting away the locking device.

These and other objects of the invention will be apparent from an examination of the following description and drawings.

THE DRAWINGS

It will be understood that, for purposes of clarity, certain elements may have been intentionally omitted from certain views where they are believed to be illustrated to better advantage in other views.

THE DESCRIPTION

Figure 1:
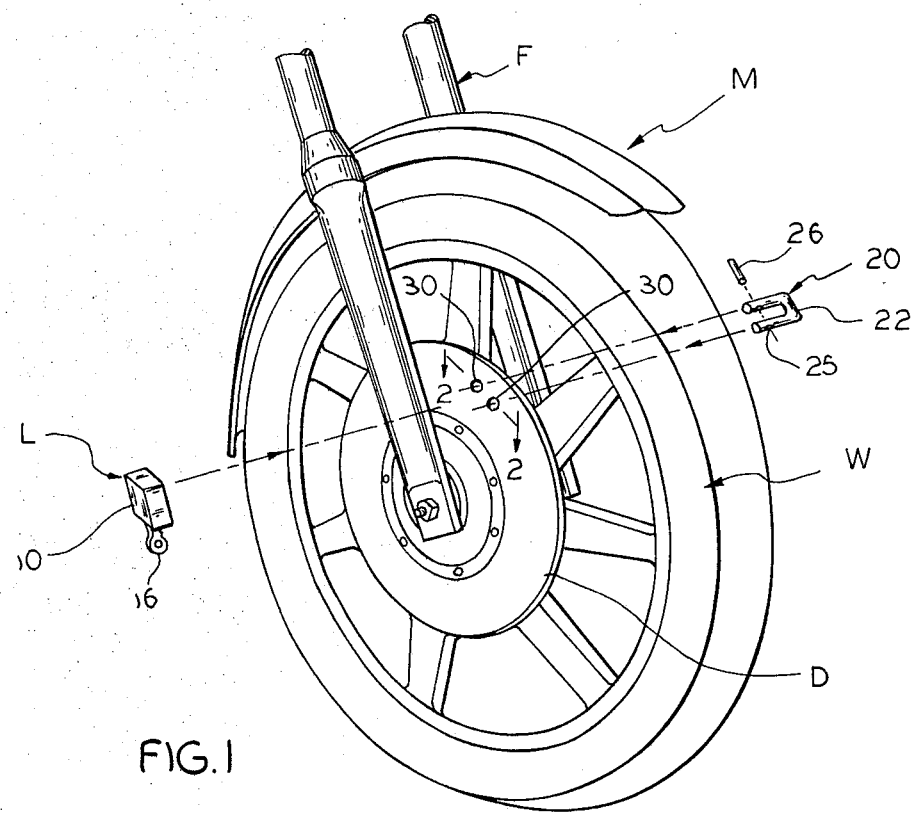
FIG. 1 is a fragmentary perspective view of a portion of a cycle and locking device embodying features of the invention.
Figure 2:
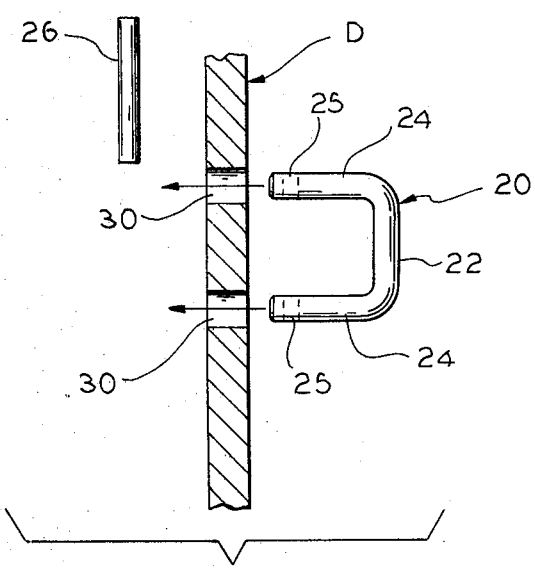
FIG. 2 is a fragmentary view, partially in section, taken on line 2—2 of FIG. 1, as seen prior to the application of the retaining element to the disc.
Figure 3:
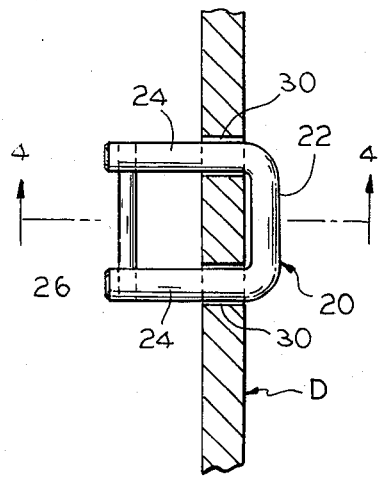
FIG. 3 is a view similar to that of FIG. 2, but shown after the application of the retaining element to the disc.

Referring now to the drawings for a better understanding of the invention, and particularly to FIG. 1, it will be seen that a locking device embodying features of the invention, and indicated generally at L, is shown adjacent a disc D secured to a wheel W adjacent a fork F of a motorcycle M.

The lock device consists of a retaining element 20 and a lock having a body 10.

The lock device housing or body 10 is of the general type disclosed in U.S. Pat. No. 3,769,821, and includes a cavity 12 open on only one side thereof for receiving a portion of said retaining member in a manner hereinafter described. Housing 10 also includes a shaft 14 which is moveable axially within cavity 12 and is actuated by means of a removeable key 16.

The retaining member 20 is generally U-shaped and includes a center element 22 having formed integrally therewith and extending from the ends thereof a pair of side elements 24 which are provided with aligned holes 25 for receiving a pin 26 in a manner hereinafter described.

Figure 5:
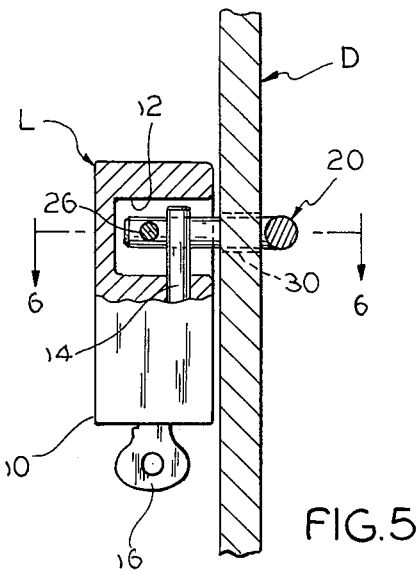
FIG. 5 is a view similar to that of FIG. 4, but with the lock device housing and retaining element engaged in locked position.
Figure 4:
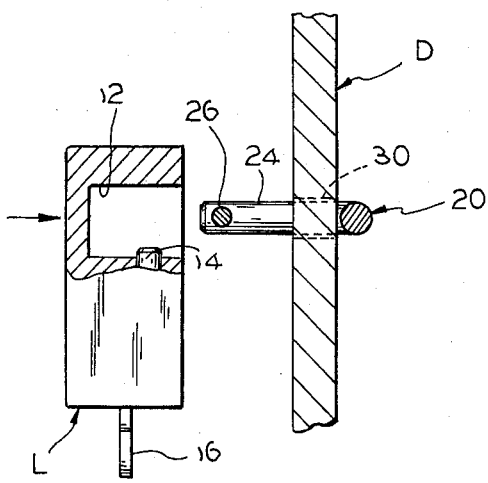
FIG. 4 is a section taken on line 4—4 of FIG. 3 and including a side elevation, with portions broken away, of the housing portion of the lock device.
Figure 6:
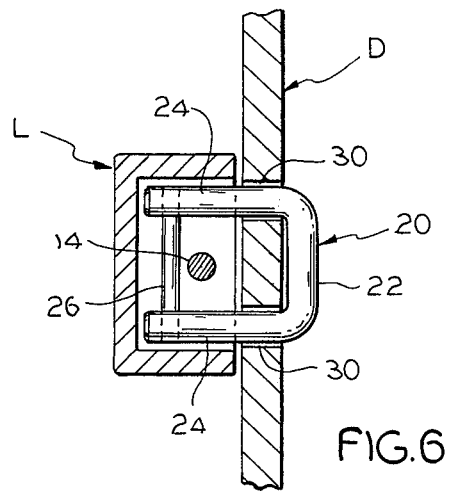
FIG. 6 is a section taken on line 6—6 of FIG. 5.

As best seen in FIGS. 1, 5, and 6, in order to secure the locking device on the cycle to prevent rotation of Wheel W, retaining member side elements 24 are inserted through appropriate holes 30 in disc D from the inboard side of the disc so they project beyond the outboard side of the disc, while the center element 22 lies against the inboard surface of the disc to prevent the retaining member from being pulled through the disc from the inboard to the outboard side.

After side elements 24 have been inserted through disc holes 30, pin 26 is inserted through aligned holes 25 in side elements 24 to connect side elements 24 at the outboard end of retaining member 20.

Lock body or housing 10 is then inserted against the outboard surface of disc D with cavity 12 receiving the now closed end of the retaining member 20.

Shaft 14 of the lock body is then actuated by key 16 and moved axially within cavity 12 through the closed end of the retaining member.

Thus, with the locking device in locked position, it is impossible to rotate the wheel W of the cycle M a complete rotation, because the lock housing 10 will engage the fork F of the cycle to prevent further rotation of the wheel.

Also, because the lock housing 10 is against the outboard surface of disc D, there is no way one could have access to the retaining member side elements to destroy them with a saw or cutter. Additionally, the center element 22 of the retaining member is snugly against the inboard surface of the disc D, so that it is not accessible for cutting or sawing.

Figure 7:
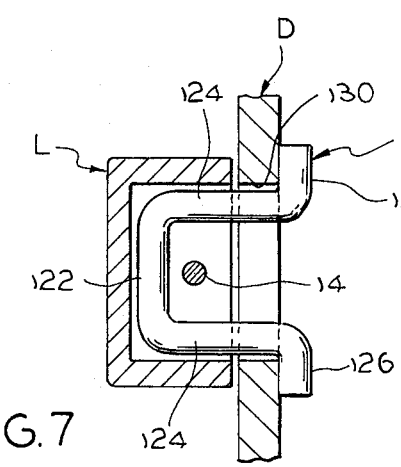
FIG. 7 is a view similar to that of FIG. 6, but showing a retaining element of a slightly modified form.

Referring now to FIG. 7, a slightly modified form of the invention is illustrated. All of the parts shown are the same as in the first embodiment, previously described, except that disc D has in place of the two spaced holes 30, a single hole 130 of a larger diameter sufficient to receive a wider center portion of a retaining member 120.

Member 120 has a center element 122, a pair of integral side elements 124, and a pair of integral end elements 126.

The operation of this embodiment is similar to that of the previously described embodiment. Again the closed end of the retaining member 120 is inserted through hole 130 in disc D, and the lock body 10 is applied in the same manner as in the previous embodiment.

Figure 8:
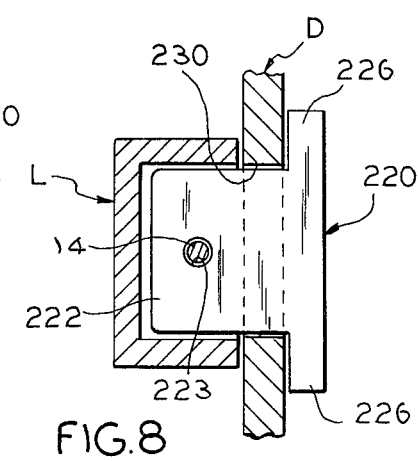
FIG. 8 is a view similar to that of FIG. 6, but showing a retaining element of a slightly modified form.

Referring to FIG. 8, it will be seen that another modified form of the invention is shown. In this embodiment, retaining member 220 is in the form of a relatively flat, T-shaped bar which has a main or center portion 222, provided with a hole 223 for receiving shaft 14 of the lock L, and a pair of extensions 226 which project laterally outward from center portion for engagement with the inboard surface of disc D in the same manner as end elements 126 of the previously described embodiment.

Again, the operation of this embodiment is the same as the previously described embodiments.

I claim:

1. In a locking device for a cycle having a fork, a wheel mounted in the fork, and a brake disc, with opening means extending therethrough, secured to said wheel outboardly thereof, the combination of:
   (a) a housing member including a body having a cavity therein, open at only one side thereof, and adapted to have said one side mounted against an outboard surface of said disc adajcent said opening means;
   (b) a retaining member including:
      (i) an inboard portion adapted to be mounted against an inboard surface of said disc adjacent said opening means;
      (ii) an integral outboard portion adapted to extend from said inboard portion, through said opening means and into said housing member cavity;
   (c) said housing member also including a lock element mounted for movement within said cavity into and out of engagement with the outboard portion of said retaining member to keep said disc snugly positioned between opposed surfaces of said retaining member inboard portion and said housing member body;
   (d) means for moving said lock element into and out of engagement with said retaining member outboard portion.

2. A locking device according to claim 1, wherein said retaining member outboard portion is in the form of a closed loop.

3. A locking device according to claim 1, wherein said retaining member outboard portion is formed by a pair of generally parallel side elements and a removable pin extending therebetween.

4. A locking device according to claim 1, wherein said retaining member is a unitary structure.

5. A locking device according to claim 4, wherein said retaining member includes a center element, a pair of side elements extending from opposite ends of said center element and normal thereto, and a pair of end elements extending from corresponding ends of respective side elements and normal thereto.

6. A locking device according to claim 1, wherein said lock element is key actuated.

7. A locking device according to claim 1, wherein said retaining member includes a U-shaped structure and a removable pin interconnecting free ends of said structure.

8. A locking device according to claim 1, wherein said retaining member is in the form of a generally flat, T-shaped bar having an opening in an outboard portion thereof for receiving said lock element.

9. In a locking device for a cycle having a fork, a wheel mounted in the fork, and a brake disc, with opening means extending therethrough, secured to said wheel outboardly thereof, the combination of:
   (a) a housing member including a body having a cavity therein, open at only one side thereof, and adapted to have said one side mounted against an outboard surface of said disc adjacent said opening means;
   (b) a one-piece, generally flat, T-shaped retaining member including:
      (i) an inboard portion adapted to be mounted against an inboard surface of said disc adjacent said opening means;
      (ii) an integral outboard portion adapted to extend from said inboard portion, through said opening means and into said housing member cavity and having an aperture therein;
   (c) said housing member also including a lock element mounted for movement within said cavity into and out of the aperture of the outboard portion of said retaining member to keep said disc snugly positioned between opposed surfaces of said retaining member inboard portion and said housing member body;
   (d) means for moving said lock element into and out of said retaining member outboard portion aperature.

* * * * *